(12) United States Patent
Lie

(10) Patent No.: US 6,725,299 B2
(45) Date of Patent: Apr. 20, 2004

(54) FIFO OVERFLOW MANAGEMENT

(75) Inventor: Kok Tjoan Lie, South Hurstville (AU)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 09/769,322

(22) Filed: Jan. 26, 2001

(65) Prior Publication Data

US 2001/0018734 A1 Aug. 30, 2001

(30) Foreign Application Priority Data

Feb. 11, 2000 (AU) .............................................. PQ5557

(51) Int. Cl.[7] .............................................. G06F 13/14
(52) U.S. Cl. .......................... 710/57; 710/53; 711/165; 711/159; 711/154; 711/365; 711/221
(58) Field of Search ...................... 710/57, 53; 365/221; 711/165, 154, 159

(56) References Cited

U.S. PATENT DOCUMENTS

| | | | |
|---|---|---|---|
| 5,696,990 A | * 12/1997 | Rosenthal et al. .......... 395/849 |
| 5,841,722 A | * 11/1998 | Willenz ...................... 365/221 |
| 5,892,979 A | * 4/1999 | Shiraki et al. .............. 395/872 |
| 5,893,924 A | * 4/1999 | Bahls et al. ................. 711/165 |
| 6,044,419 A | * 3/2000 | Hayek et al. ................. 710/57 |

* cited by examiner

Primary Examiner—Abdelmoniem Elamin
(74) Attorney, Agent, or Firm—Fitzpatrick, Cella, Harper & Scinto

(57) ABSTRACT

Disclosed is method and apparatus (20) for improving the performance of a pipeline system in which a FIFO (24) is incorporated in the pipeline between an upstream processing module (22) and a downstream processing module (26), each of the modules (22, 26) having access to a common external memory (32), this being typical in many ASIC arrangements. The method commences with detecting when the FIFO (24) is substantially full and transferring commands from the upstream module (22) to the external memory (32). Commands received by the downstream module (26) from each of the FIFO (24) and the external memory (32) are interpreted to determine a source of following ones of the commands.

9 Claims, 3 Drawing Sheets

FIFO OVERFLOW MANAGEMENT

FIELD OF THE INVENTION

The present invention relates to FIFO apparatus and, in particular, to the use of such apparatus in a pipeline processor arrangement.

BACKGROUND

The performance of individual submodules in a pipeline processor arrangement depends on the incoming command and/or data rate, and the complexity of operation on those commands and/or data that the submodule is required to perform. The time taken by a submodule to execute a command varies according to the complexity of the command and also to the stall direction and frequency of the downstream submodule. In those cases where the rate of execution of commands varies for two neighboring pipeline submodules, a first-in-first-out register apparatus (FIFO) of a predetermined length is usually inserted between the submodules to absorb some latencies associated with the first (upstream) submodule while the second (downstream) submodule is stalled or busy. The size of the FIFO is usually a compromise between performance and cost, unfortunately there may never be an optimum size as the stall pattern may greatly vary for the two submodules involved.

SUMMARY OF THE INVENTION

It is an object of the present invention to substantially overcome, or at least ameliorate one or more deficiencies with existing arrangements.

In accordance with one aspect of the present invention there is disclosed a method of improving the performance of a pipeline system in which a FIFO is incorporated in said pipeline between an upstream processing module and a downstream processing module, each of said modules having access to a common external memory, said method being characterised by:

detecting when said FIFO is substantially full and transferring commands from said upstream module to said external memory; and interpreting commands from each of said FIFO and said external memory to said downstream module to determine a source of following ones of said commands.

In accordance with another aspect of the present invention there is disclosed a pipelined processor system comprising:

an upstream processor module;

a downstream processor module;

a FIFO arrangement coupling an output of said upstream module to an input of said downstream module to thus form a processor pipeline;

a memory module accessible by each of said processor modules; and an overload arrangement by which a filling of said FIFO arrangement is detected and said output of said upstream module is directed for intermediate storage in said memory module and by which said downstream module can interpret commands received from each of said FIFO arrangement and said memory module to determine a source of subsequent commands.

Other aspects of the invention are also disclosed.

BRIEF DESCRIPTION OF THE DRAWINGS

The prior art and an embodiment of the invention will now be described with reference to the drawings in which.

DETAILED DESCRIPTION OF EMBODIMENTS OF THE INVENTION

Figure 1:
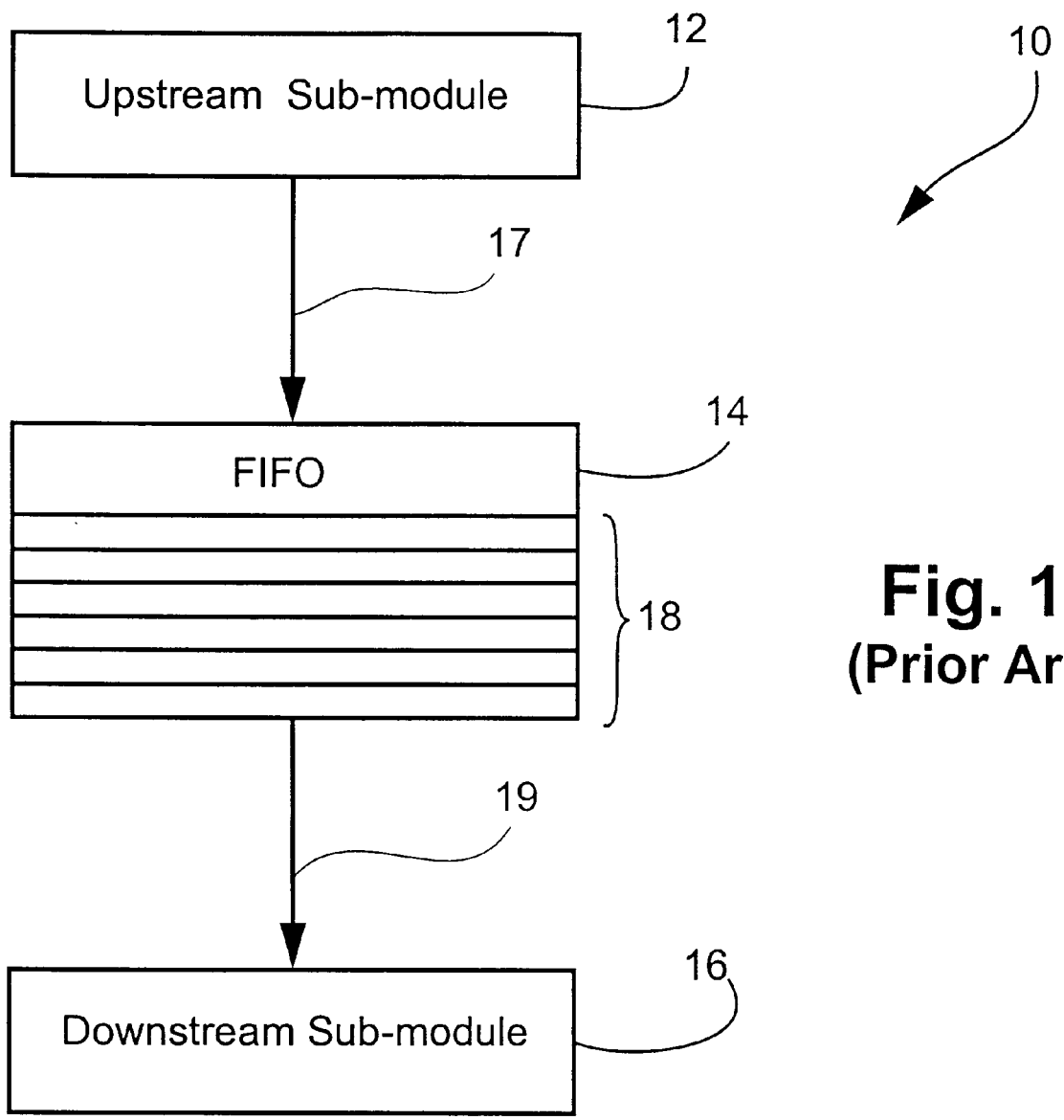
FIG. 1 is a schematic block diagram showing conventional approach of pipelined modules with an interposed FIFO.

FIG. 1 shows a conventional pipelined system 10 having an upstream submodule 12, a downstream submodule 16, and a FIFO 14 placed between two submodules 12 and 16, and interconnected by connections 17, 19. Each of the submodules 12 and 16 have variable latencies to execute or generate commands. The FIFO 14 has a number of internal registers or memories 18, and as a consequence of a traditional operation thereof, the upstream submodule 12 is free to generate commands at least until the registers 18 are full, whereupon the submodule 12 will be stalled. With variable latency, it is possible that the downstream submodule 16 is then able to process the commands with minimal latency and consequently drain the contents of the FIFO 14 at a faster rate than the upstream module 12 can generate or supply those contents. In such circumstances, the overall performance of the arrangement is only slightly improved compared to a configuration in which the submodules 12 and 16 are directly coupled, as the downstream submodule 16 will have to wait for the upstream submodule 12 to generate more commands. Further, the performance of the system 10 is very much dependent on the size of the FIFO 14, being the number of registers 18, which is usually chosen as a compromise between performance and cost.

Figure 2:
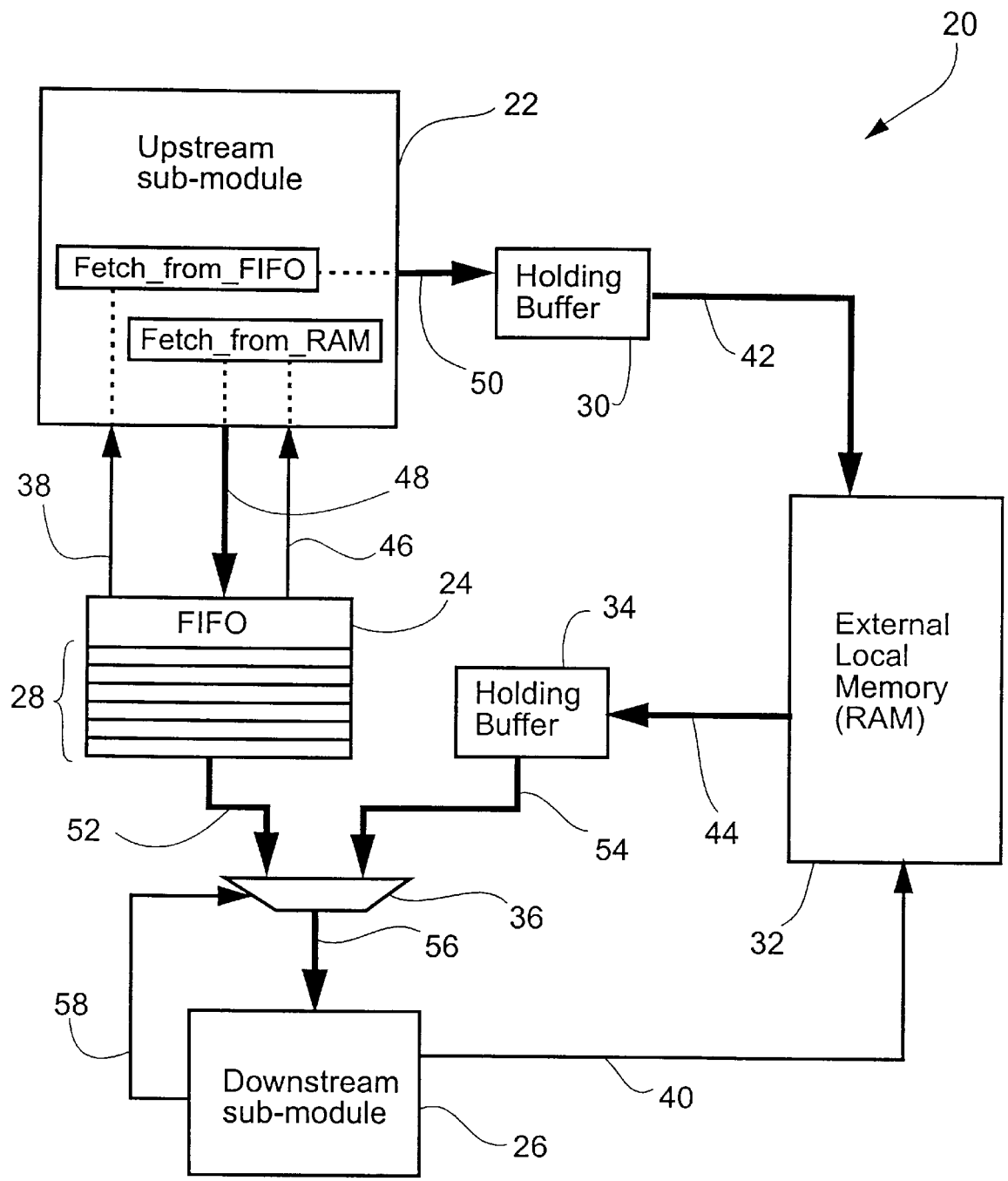
FIG. 2 is a schematic block diagram representation showing a pipelined system with interposed FIFO according to preferred embodiment of the present invention.

FIG. 2 shows a system 20 according to the preferred embodiment, having upstream and downstream modules 22 and 26 respectively, and a local FIFO 24 positioned therebetween. Both submodules 22 and 26 also have access to a common external local memory 32, this being a feature of many submodule configurations, particularly where the submodules 22 and 26 are each formed within the same integrated circuit package. The external local memory 32 typically provides for random access localised storage for operations performed individually or collectively by the processor submodules 22 and 26. In this description, reference is made to "commands" being passed between the submodules 22 and 26 and such references are to be interpreted without limitation as including instructions, data, signals or any information that may be passed between the submodules 22 and 26 as required or determined by their respective functions.

While the FIFO 24 is not full, the upstream submodule 22 passes commands into the FIFO 24 and the downstream submodule 26 fetches commands from the FIFO 24 as per conventional approach discussed above. When the FIFO 24 becomes full or substantially full, the upstream submodule 22 is not stalled as in the conventional approach of FIG. 1, but rather is able to continue on generating commands for the downstream submodule 26. However, instead of passing the generated commands into the FIFO 24, the upstream module 22 transfers the commands to the local memory 32.

For optimal performance, transfers to the external memory 32 are performed in "burst mode fashion", known in the art of memory utilization, preferably in groups of 8 or 16 commands for a single memory transaction. This operation is repeated for that period during which FIFO 24 remains or is substantially full. To facilitate burst mode transfer, the upstream submodule 22 outputs commands via a connection 50 to a holding buffer 30 which has a capacity of the predetermined burst size. Such an approach reduces any latency associated with access to the local memory 32, which otherwise can be quite severe if only a small number of commands were to handled for each memory access.

Figure 3:
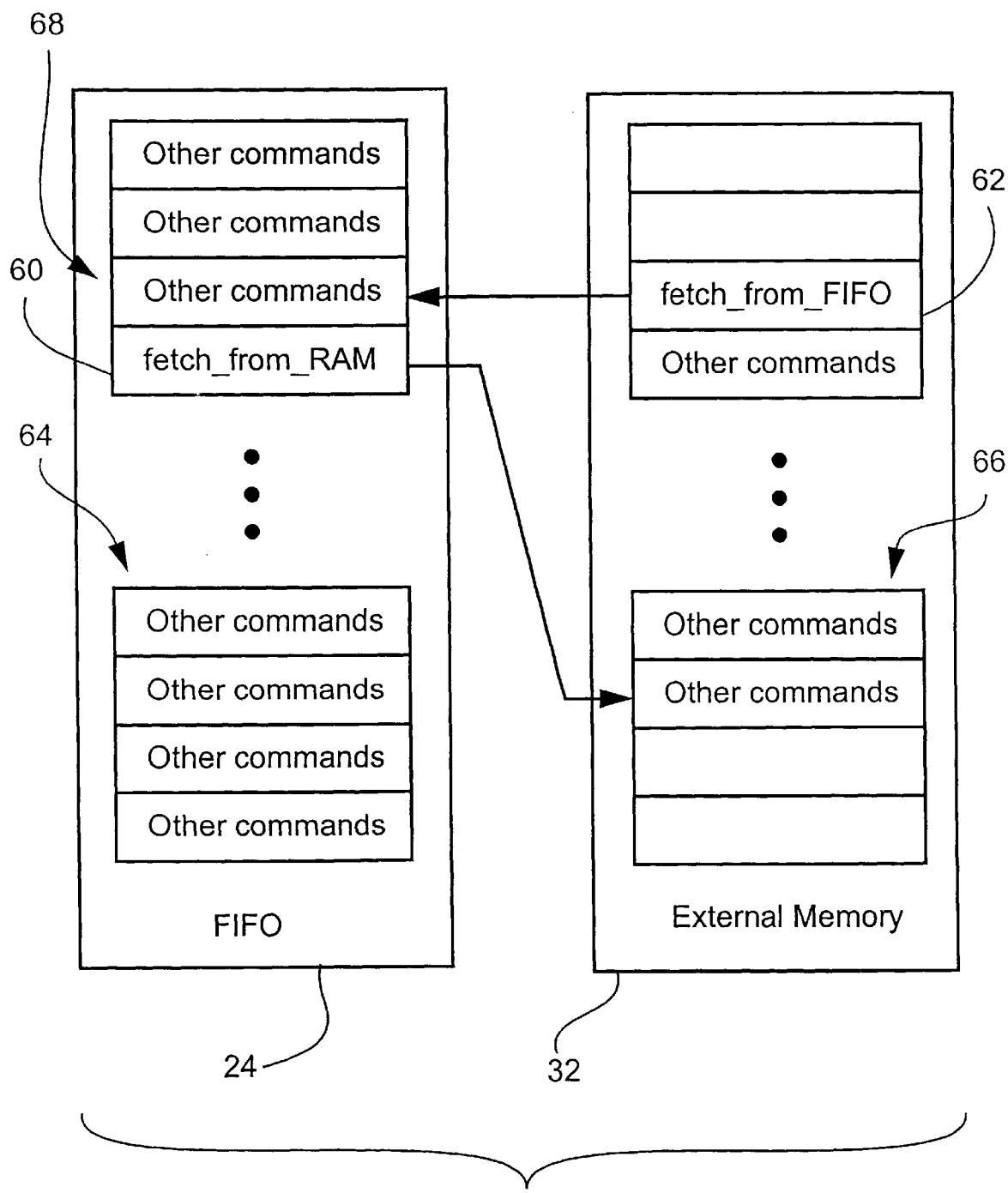
FIG. 3 shows example of the contents of the external memory and FIFO of FIG. 2 including the two special commands.

The state of the FIFO 24 is communicated to the upstream module 22 by two signals 38 and 46. When the FIFO 24 becomes substantially full, for example with only one or two, or some other predetermined number of locations remain empty, the signal 46 is asserted which causes the upstream submodule 22 to place a first special command 60 into the FIFO 24 via the connection 48. At such time, the submodule 22 immediately commences sending commands to the external memory via the holding buffer 30. The first special command 60 is an instruction "fetch_from_RAM", and is seen in FIG. 3 loaded into the FIFO 24. When received by the downstream submodule 26 via the FIFO 24, the first special command 60 directs the downstream submodule 26 to fetch following commands from the external memory 32, instead of the FIFO 24. The address to fetch the commands in the external memory 32 is specified as one of the parameters in the first special command 60.

The upstream submodule 22 continues to store commands into the external memory 32 via the holding buffer 30, until such time as the FIFO 24 is made available. The FIFO 24 also generates the signal 38 identifying to the upstream submodule 22 that there are at least a certain number of free or available locations 28 in the FIFO 24. For example, this may occur when the FIFO 24 is, say, about three-quarters full.

Upon detecting such an "available" condition of the FIFO 24, the upstream submodule 22 writes to the external memory 32 a second special command 62 "fetch_from_FIFO", also seen in FIG. 3, immediately after a "last" command is stored into the external memory 32. The second special command 62 acts as an instruction for the downstream submodule 26 to fetch following commands from the FIFO 24 and continue fetching from the FIFO 24 until another "fetch_from_RAM" command 60 is encountered.

In this fashion, where the FIFO 24 has, say, 24 locations, and the holding buffer 30 has 8 locations, the holding buffer 30 may be loaded with 6 commands followed by one of the second special commands 62 (fetch_from_FIFO) thereby enabling a single burst-mode memory transaction to occur with the memory 32 sufficient to free space within the FIFO 24 for storing further commands.

With such arrangements, memory space in the FIFO 24 or external memory 32 is not wasted with special commands 60 and 62 interleaving with actual commands.

Operation of the downstream submodule 26 is similar to and complements that of the upstream submodule 22. The downstream submodule 26 has two possible sources of receiving commands, one from the FIFO 24, and the other from the external memory 32. Again, for optimal performance, a further holding buffer 34 is provided to store commands being fetched via a connection 44 in burst mode fashion from the external memory 32 by the downstream submodule 26.

With reference to FIG. 3, the submodule 26 fetches (ordinary) commands 64 from the FIFO 24 until a "fetch_from_RAM" command 60 is encountered that indicates that following commands 66 are located in the external memory 32 starting from a given address. The downstream submodule 26 must fetch the commands 66 from the memory 32 and place those command in the holding buffer 34, and at the same time, switch the command source from the FIFO 24 to the holding buffer 34.

Such operation is achieved by a multiplexer 36 positioned between the FIFO 24 and holding buffer 34, and the downstream submodule 26. The multiplexer 36 is controlled by a signal 58 generated by the downstream submodule 26 on receipt of the special command 60. The holding buffer 34 can be maintained full through pre-fetching, which can further reduce any latency associated with access to the external memory 32. The downstream submodule 26 is then able to continue fetching from the external memory 32 via the holding buffer 34 until the special command 62 "fetch_from_FIFO" is found, on receipt of which the submodule 26 switches the multiplexer 36 via the signal 58 so that commands are then sourced from the FIFO 24.

With the system 20, the size of the FIFO 24, compared with the prior art FIFO 14, can be reduced to compensate against provision of the holding buffers 30 and 34 that are needed at the output 50 of upstream submodule 22 and input 54 to the downstream submodule 26. Such a reduction in size of the FIFO 24 is considered by the present inventor to have little effect on the overall performance in typical applications as the net effect of the system 20 is a FIFO having a dynamic capacity but which operates without any substantial latency, excepting that imposed by the transfer and handling of the special commands described above.

The FIFO system 20 finds application in pipelined processing arrangements which are provided with local memory that is available for use by members of the pipeline. Typically, such memory has a capacity many times larger than memory which would be configured or used by a traditional FIFO. Examples of such arrangements include graphic object rendering hardware in which certain rendering processes are pipelined and operate according to instructions passed along the pipeline or according to data stored in memory, such data being for example generated, modified or used by the pipelined processes. The preferred embodiment comprises an implementation within a synchronous graphic pipelined processor having two or more submodules, each submodule having a different task to perform.

The forgoing describes only one embodiment of the present invention and modifications may be made thereto without departing from the scope of the present invention.

What is claimed is:

1. A method of improving the performance of a pipeline system in which a FIFO is incorporated in said pipeline between an upstream processing module and a downstream processing module, each of said modules having access to a common external memory, said method being characterised by:

said upstream module detecting when said FIFO is substantially full and outputting a first special command to said FIFO indicating that commands output following the special command are to be sourced from said external memory, said upstream module thereafter transferring said following commands from said upstream module to said external memory; and said downstream module interpreting commands from each of said FIFO and said external memory to determine a source of said commands wherein upon receipt of said first special command from said FIFO, said downstream module sources said following commands from said external memory.

2. A method according to claim 1, further comprising detecting when said FIFO has a predetermined number of vacant locations and, when so, instructing said upstream module to cease transferring commands to said external memory, a terminal one of said transferred commands being a second special command which, when received by said downstream module from said external memory, causes said downstream module to source subsequent ones of said commands from said FIFO.

3. A method according to claim 1, wherein transfer of commands to and from said external memory occurs in burst mode comprising a predetermined data transfer size, said method comprising the further steps of buffering commands output from said upstream module to said external memory, and from said external memory to said downstream module, to facilitate burst mode transfers.

4. A pipelined processor system comprising:
   an upstream processor module;
   a downstream processor module;
   a FIFO arrangement coupling an output of said upstream module to an input of said downstream module to thus form a processor pipeline;
   a memory module accessible by each of said processor modules;
   said upstream module having an overload arrangement configured to detect a filling of said FIFO arrangement by commands output from said upstream module and to thereby output a special command to said FIFO arrangement indicating that commands output following said special command are to be sourced from said memory module, and to thereafter direct said following commands output from said upstream module for intermediate storage in said memory module; and
   said downstream module having an interpreting arrangement configured to interpret commands received from each of said FIFO arrangement and said memory module to determine a source of said commands to be input to said downstream module, a receipt of said special command from said FIFO directing said downstream module to source said commands from said memory module.

5. A system according to claim 4, wherein said upstream module is configured to generate a second special command in response to said FIFO arrangement having a predetermined number of available locations, said second special command being output to said memory module and thereafter subsequent ones of said commands being output from said upstream module to said FIFO arrangement wherein said interpreting arrangement upon receipt of said second special command from said memory module sources said subsequent commands from said FIFO arrangement.

6. A system according to claim 5, wherein said interpreting arrangement comprises a switching device for selectively coupling an output of one of said FIFO arrangement and said memory module to an input of said downstream module in response to receipt by said downstream module of a corresponding one of said special command and said second special command.

7. A system according to claim 4, further comprising a first holding buffer interconnecting said upstream processor module to said memory module and a second holding buffer interconnecting said memory module to said downstream module, each said holding buffer facilitating burst mode memory transfers with said memory module.

8. A system according to claim 4, wherein said system is formed within a single integrated circuit.

9. An integrated circuit processor device comprising:
   a processor pipeline including at least an upstream module, a downstream module and a FIFO arrangement, said FIFO arrangement being configured to couple an ordered sequence of commands output from said upstream module to an input of said downstream module;
   a memory module independently accessible by each of said upstream and downstream modules;
   an overload arrangement forming part of said upstream module and configured to detect a filling of said FIFO arrangement by said commands output from said upstream module and to thereby output a first special command to said FIFO arrangement indicating that commands output following said special command are to be sourced from said memory module, and to thereafter direct said following commands output from said upstream module for intermediate storage in said memory module, said overload arrangement being further configured to generate a second special command in response to said FIFO arrangement having a predetermined number of available locations, said second special command being output to said memory module and thereafter to direct subsequent ones of said commands output from said upstream module to said FIFO arrangement; and
   an interpreting arrangement forming part of said downstream module and configured to interpret commands received from each of said FIFO arrangement and said memory module to determine a source of said commands to be input to said downstream module, a receipt of said first special command from said FIFO arrangement directing said downstream module to source said commands from said memory module and a receipt of said second special command from said memory module directing said downstream module to source said subsequent commands from said FIFO arrangement.

* * * * *